March 28, 1939.  C. L. HALL  2,152,590
STRIP FASTENER
Filed Dec. 10, 1936
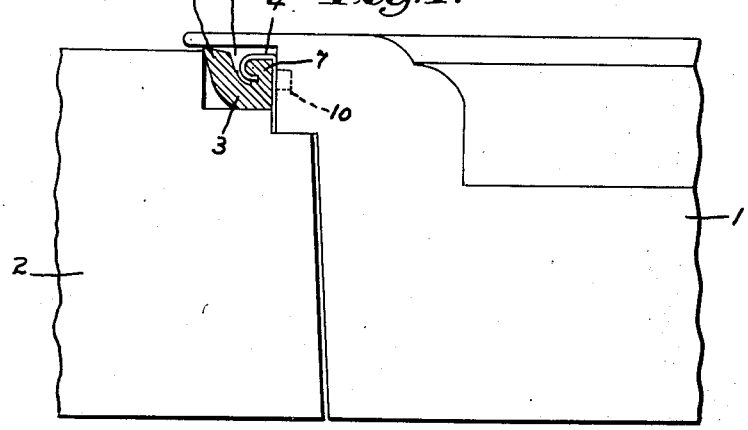
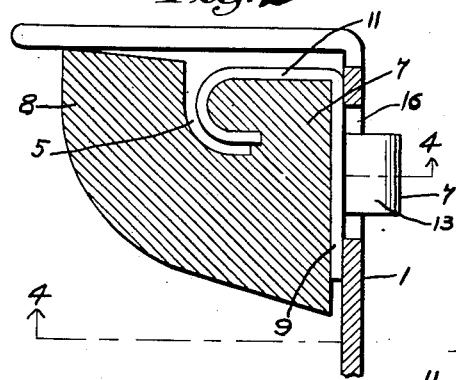
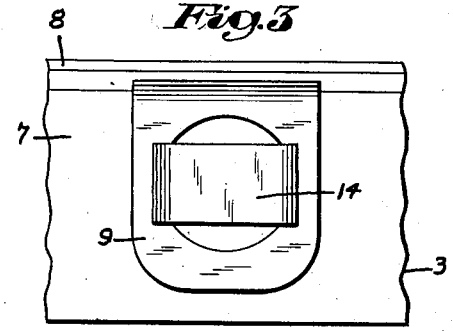
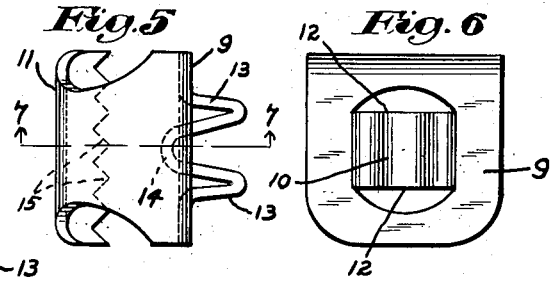
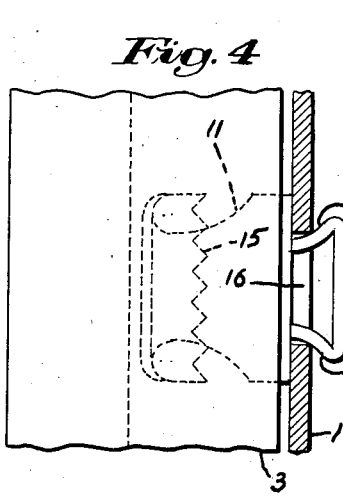
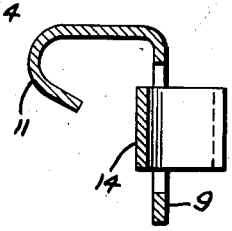
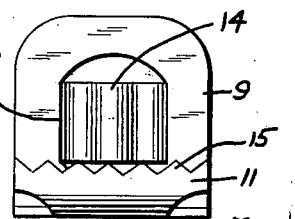
Inventor
Charles L. Hall.
by Walter J. Jones Att'y.

Patented Mar. 28, 1939

2,152,590

UNITED STATES PATENT OFFICE 2,152,590

STRIP FASTENER

Charles L. Hall, Detroit, Mich., assignor to United-Carr Fastener Corporation, Cambridge, Mass., a corporation of Massachusetts Application December 10, 1936, Serial No. 115,118

2 Claims. (Cl. 85—5)

My invention aims to provide improvements in strip-attaching fastening members and installations thereof.

In the drawing which illustrates a preferred embodiment of my invention:

Figure 1 is a more or less schematic view of a portion of a door structure showing one of my improved fastening members holding a strip in position;

Fig. 2 is an enlarged section of a portion of a door, fastener member and strip showing my invention;

Fig. 3 is an edge view of the strip and fastener shown in Fig. 2, the door being removed;

Fig. 4 is a section taken on the line 4—4 of Fig. 2;

Fig. 5 is an end view of my improved fastener device prior to attachment;

Fig. 6 is a bottom plan view of my improved fastener device;

Fig. 7 is a section taken on the line 7—7 of Fig. 5; and

Fig. 8 is a top plan view of my improved fastener device.

My invention is particularly useful in connection with attaching weather stripping to doors or door frames of motor vehicles to keep out drafts. In the present day motor vehicles rubber or other similar material in flexible strips is used between the door and the door-supporting frame to seal the space against either the inflow or outflow of air. It should be understood, however, that my invention is not limited to this specific installation but may be used in other suitable installations.

Referring now to the particular installation and fastener I have selected for illustration of my invention by the annexed drawing, I have shown rather diagrammatically (Figure 1) a portion of a door 1, a portion of a door support 2, a section of a flexible strip 3 and my improved fastener member 4. It will be noted that the strip 3 is of special shape in cross-section and has a groove 5 dividing the strip into a clamping portion 7 and a free flexible sealing portion 8, as clearly shown in Fig. 2.

My improved fastening device (Figs. 5, 6, 7 and 8) is preferably formed from a single piece of soft bendable metal such, for instance, as cold rolled steel. The fastener has a base portion 9, an expansible attaching portion 10 and a hook-shaped strip-gripping portion 11. The attaching portion is preferably pressed from the base portion 9 and has two of its opposed side faces 12—12 free from the base portion and cut away, as shown in Figs. 6 and 7, to allow for expansion of the side walls 13—13. The bottom portion of the attaching portion 10 is pressed inwardly to provide a fold 14 extending toward the base portion 9, as clearly shown in Fig. 5. The strip-gripping portion 11 is preferably in the form of a hook extending from one edge of the base portion 9 (Fig. 7) and having teeth 15 at the free end of the hook, as shown in Figs. 5 and 8.

Assembly of the parts of the installation is a rather simple matter and may take place in the following manner: The door 1 or other part to which the fastener member is to be attached is preferably provided with one or more apertures 16 (Fig. 2) which may be of any suitable shape. The fastener member is first attached to the sheet metal door portion by placing it in position with the attaching portion 10 passing through an aperture 16, as shown in Fig. 2, and then a suitable tool is placed against the fold 14. Thereafter the tool is moved in any suitable manner to press the fold 14 away from the base portion 9 thereby causing the walls 13—13 to be spread outwardly beyond the inner face of the sheet metal portion of the door (Fig. 4) to hold the fastener member securely in position. After the fastener or fasteners have been attached in the manner just described the strip 3 is securely attached in the desired position around the door by manipulating the strip relative to the hook portion of a fastener so that the hook portion enters into the slot 5 in the strip 3. Then the flexible sealing portion 8 of the strip is moved relative to the attaching portion so that a suitable tool may be engaged with the strip-engaging portion 11 of the fastening member. This tool (not shown) may be manipulated in any suitable manner to cause the hook-shaped portion to be clamped into engagement with the attaching portion 7 of the strip 3 (Fig. 2). During this clamping operation the hook-shaped portion of the strip-engaging portion 11 may be changed from the shape shown in Fig. 7 to the shape shown in Fig. 2 and the teeth 15 are embedded in the material of the strip 3 to prevent it from slipping when the strip is pulled tightly during the positioning operation.

My improved fastening device is particularly useful in connection with the type of installation described because the expansible attaching portion 10 adapts itself readily to substantial tolerances in the aperture 16 and also in the thickness of the part through which it passes. Furthermore, once the fastener is secured in position it cannot be pulled loose through any normal or even substantial abnormal stresses exerted upon it. Furthermore, since the attaching portion is required to be of material which may be easily bent it permits the strip-gripping portion 11 being made as an integral part of the fastener and of soft material so that it also may be deformed to a strip-gripping shape thereby securely holding a suitable strip.

My improved fastener and installation are simple, strong, inexpensive and the parts may be assembled easily and positively with a minimum amount required labor.

While I have illustrated and described a preferred embodiment of my invention it should be understood that changes in the fastener and uses thereof with other forms of parts than those specifically described may be made without departing from the scope of my invention which is best defined by the following claims.

I claim:

1. A fastening device of the class described formed from one piece of sheet metal and having a base portion, an attaching means extending from said base portion at one side thereof and a clamping portion integral with said base portion, said clamping portion having a portion extending away from said base in angular relation thereto and a free end portion extending toward said base, said free end portion having a substantial width and providing a row of teeth at its outermost free end so as to engage a strip disposed between said free end and said base for clamping said strip to said base.

2. A fastening device of the class described formed from one piece of sheet metal and having a base portion, an attaching means extending from said base portion at one side thereof and a clamping portion integral with said base portion, said clamping portion having a portion extending away from said base in substantially right-angular relation thereto and a free end portion extending toward said base, said free end portion having a substantial width and providing a row of teeth, said teeth being disposed substantially in the plane of said free end portion so as to engage a strip disposed between said free end and said base for clamping said strip to said base.

CHARLES L. HALL.